(12) United States Patent
Åkerlund

(10) Patent No.: US 7,760,333 B2
(45) Date of Patent: Jul. 20, 2010

(54) JAMMING DEVICE AND METHOD

(75) Inventor: Hans Åkerlund, Göteborg (SE)

(73) Assignee: Saab AB, Linköping (SE)

(*) Notice: Subject to any disclaimer, the term of this patent is extended or adjusted under 35 U.S.C. 154(b) by 0 days.

(21) Appl. No.: 11/791,461

(22) PCT Filed: Nov. 24, 2004

(86) PCT No.: PCT/SE2004/001716

§ 371 (c)(1),
(2), (4) Date: May 24, 2007

(87) PCT Pub. No.: WO2006/057579

PCT Pub. Date: Jun. 1, 2006

(65) Prior Publication Data

US 2008/0074306 A1     Mar. 27, 2008

(51) Int. Cl.
*G01C 3/08* (2006.01)
(52) U.S. Cl. .................................... 356/4.01
(58) Field of Classification Search ....... 356/3.01–3.15, 356/4.01–4.1, 5.01–5.15, 139.01–139.1
See application file for complete search history.

(56) References Cited

U.S. PATENT DOCUMENTS

| 5,532,696 | A | 7/1996 | Cyrulik et al. |
| 6,624,780 | B1 | 9/2003 | Fouts et al. |
| 6,825,792 | B1* | 11/2004 | Letovsky ..................... 342/14 |
| 2002/0153497 | A1* | 10/2002 | Pepper et al. ............. 250/495.1 |
| 2005/0150371 | A1* | 7/2005 | Rickard ....................... 89/1.11 |

OTHER PUBLICATIONS

PCT/ISA/210—International Search Report—Jun. 10, 2005.
PCT/ISA/237—Written Opinion of the International Searching Authority—Jun. 16, 2005.

* cited by examiner

*Primary Examiner*—Thomas H Tarcza
*Assistant Examiner*—Luke D Ratcliffe
(74) *Attorney, Agent, or Firm*—Venable LLP; Eric J. Franklin

(57) ABSTRACT

A jamming device on an object for jamming a target seeker arranged to generate an image of its surroundings and extract targets from the image. A laser is arranged to emit laser radiation at the target seeker so that the laser radiation is projected on the image. A modulator is disposed in connection with the laser and is arranged to modulate the intensity pattern of the laser radiation with the intent of manipulating the image in order to make it more difficult for the target seeker to extract the object as a target. The invention also includes a jamming method.

5 Claims, 3 Drawing Sheets

JAMMING DEVICE AND METHOD

CROSS-REFERENCE TO RELATED APPLICATION

This application is the national phase under 35 U.S.C. §371 of PCT/SE2004/001716 filed 24 Nov. 2004.

TECHNICAL AREA

This invention concerns a jamming device on an object for jamming a target seeker arranged to generate an image of its surroundings and extract targets from the image.

The invention also concerns a method for jamming the aforementioned target seeker.

STATE OF THE ART

It can be critical for vehicles used for military purposes, such as ships, small boats, submarines and transport aircraft, to avoid, for a least a period of time, detection by a hostile target seeker so as to jam the target-tracking capability of the target seeker. Such vehicles are consequently equipped with flares and smoke bombs, which are deployed and activated when it is important to avoid detection by the hostile target seeker.

DESCRIPTION OF THE INVENTION

According to an embodiment of the invention, a jamming device is disposed on an object to jam a target seeker arranged to generate an image of its surroundings and extract targets from the image, wherein the device comprises a laser arranged to emit laser radiation at the target seeker so that the laser radiation is projected on the image, plus means disposed in connection with the laser and arranged to modulate the intensity pattern of the laser radiation with the intent of manipulating the image in order to make it more difficult for the target seeker to extract the object as a target. The laser can be run continuously and thus provides long-term protection against detection, in contrast to the protection afforded by current jamming methods involving flares, smoke, etc., since flares burn up and smoke blows away. Using a device according to the invention, it is also possible to adapt the intensity pattern of the laser radiation based on the type of object that is carrying the jamming device, and on the type of object that is functioning as the carrier for the target seeker. The object carrying the jamming device can be, e.g. a ship, a smaller boat, a submarine or a transport aircraft, while the target seeker can be, e.g. [on] a missile or a ship.

It is only possible to provide the image of an object in the target seeker by a combination of phase and amplitude modulation of the cross-section of the laser radiation as only then the laser radiation can be focused in a position other than a position determined by optical geometry so that an object is depicted instead of a Gaussian intensity pattern. When phase modulated, a phase hologram is produced in the cross section of the laser radiation. Therefore, the laser radiation need not be centered at the target seeker in order to provide an image at the target seeker. It is enough that the target seeker is somewhere within the laser lobe. A phase hologram with low resolution requires that more laser energy falls in on the target seeker while high resolution requires less phase energy falling in on the target seeker.

In a preferred embodiment, the modulating means comprise a so-called SLM ("spatial light modulator") plus control means arranged to control the setting of the SLM.

It is advantageous to allow the control means to control the setting of the SLM based on how the object is perceived by the target seeker. To make this possible, the jamming device includes elements arranged to determine the range to the target seeker, which elements supply the control means with the range information. To further adjust the setting, the range elements are also arranged to determine the angular relationship of the target tracker to the object, and to supply the control means with the angular information as well.

It is possible to control the SLM setting in a number of different ways in order to impede detection. In one example the control means control the SLM setting so that the target seeker image shows a plurality of virtual targets that move in accordance with a predetermined scheme. In one embodiment the predetermined scheme entails that the virtual target paths converge and diverge in alternating fashion. In view of access to the range and angular information, the SLM setting is also preferably controlled in such a way that the virtual targets in the image are capable of confusion with the object.

The invention further describes a method for jamming a target seeker that generates an image of its surroundings and extracts targets from the image, wherein the intensity pattern of laser radiation from a laser is modulated in order to manipulate the image, thereby making it more difficult for the target seeker to extract the object as a target.

EMBODIMENTS

Figure 1:
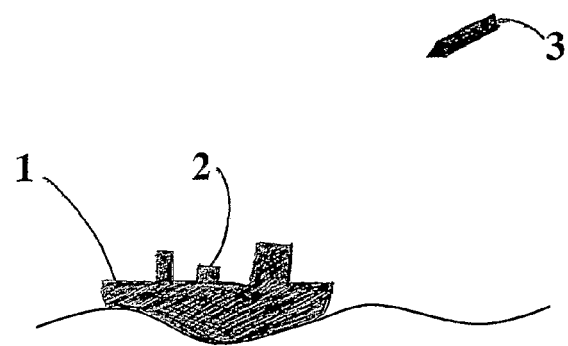
FIG. 1 schematically depicts an example of a scenario in which jamming equipment according to the invention is intended to be used.

In FIG. 1, a ship 1 is sailing on a body of water. The ship is equipped with jamming equipment 2 to jam a target seeker on an approaching hostile missile 3. The target seeker of the missile is of an electro-optical type, and is arranged to generate an image of its surroundings and extract targets from the image. The target seeker in one embodiment comprises a lens system for receiving radiation emitted or reflected from the targets, detecting means for obtaining signals in accordance therewith, which signals are compiled as a series of images in the target seeker, and an image-processing unit that extracts the targets from the images in the image series with the help of image-processing algorithms, whereupon the missile is guided toward the target based on information regarding the target positions in the images.

The description below is based on the use of a so-called spatial light modulator, or SLM. Before we proceed, we must consequently first describe briefly how such a device works. Kinoforms are computer-generated patterns that function as phase/amplitude modulators for laser radiation. An SLM is a phase/amplitude modulator and can thus be caused to function as a kinoform. The kinoform optics consist of a quantized phase pattern realized via a surface image (relief) in the SLM on a plurality of levels. The intensity distribution in the laser radiation thus created when the laser radiation is reflected from the relief can be controlled so that the radiation forms digitally defined two- and three-dimensional images. The way in which the kinoforms are to be calculated so as to imbue the laser radiation with a given intensity pattern will be obvious to one skilled in the art, and is determined by a number of parameters, such as the kinoform material, laser type, wavelength used, etc.

Figure 2:
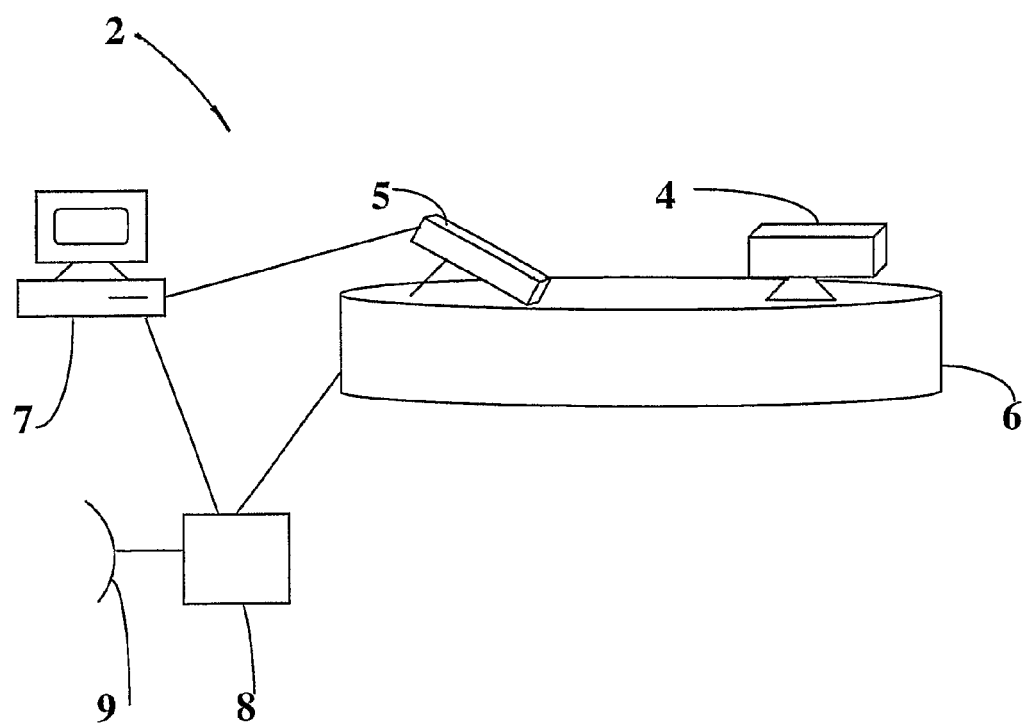
FIG. 2 schematically depicts a first embodiment of the jamming equipment according to the invention.
Figure 3:
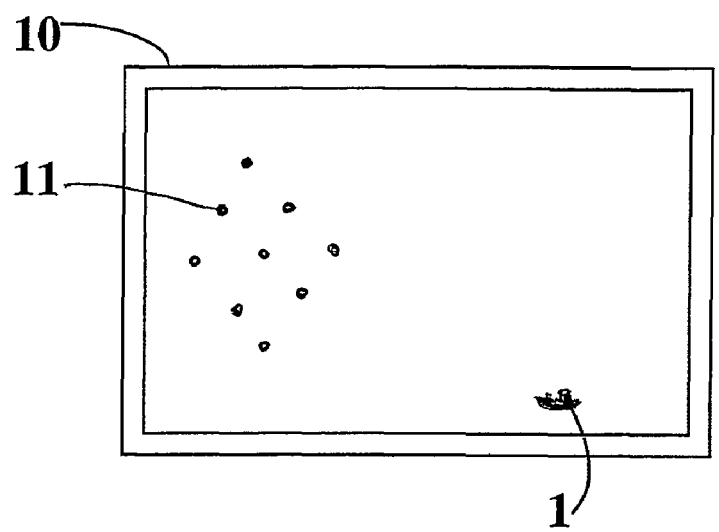
FIG. 3 shows an example of a target-seeker image jammed by the jamming equipment in FIG. 2.
Figure 4:
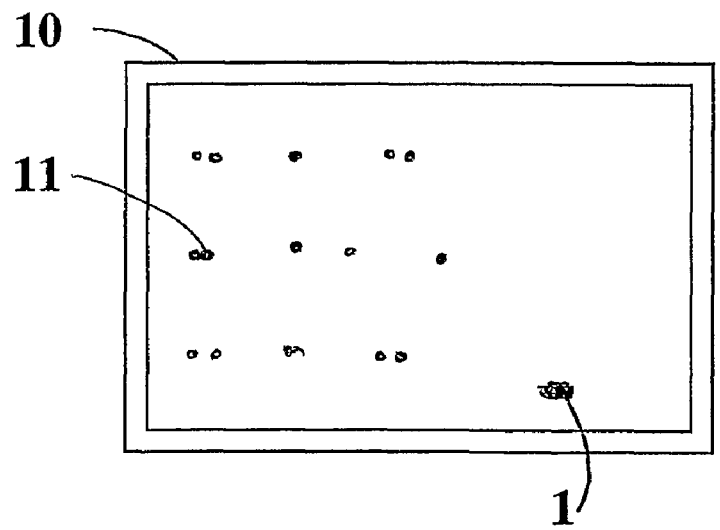
FIG. 4 shows another example of a target-seeker image jammed by the jamming equipment in FIG. 2.

In FIG. 2, the jamming equipment 2 comprises a laser 4 and an SLM 5 arranged in the beam path of the laser 4. The laser 4 is aimed at the SLM 5 so that the laser beam strikes its phase/amplitude-modulated surface. By using the ability of the SLM to function as a kinoform, a given intensity pattern is imposed on the radiation reflected from the SLM, which pattern is projected in the target seeker of the missile when the laser radiation is directed thence. In the embodiment shown in FIG. 2, the laser 4 and the SLM 5 are disposed on a rotating table 6 that is rotated based on the location of the missile 3 in relation to the ship 1 in order to aim the radiation emanating from the SLM 5. A conventional search system 8, 9 comprising a transmitter/receiver 8 and a radar antenna 9 searches in space for the hostile missile 3 and, when the missile is located, transmits position data for the missile 3 in relation to the ship. The position data are used by a calculating unit (not shown) that calculates a control signal for a motor (not shown), which motor drives the rotating table so as to direct the laser radiation toward the missile 3. A calculating unit 7 in the form of, e.g. a personal computer, is connected to the SLM and arranged to affect the setting of the SLM 5. In one embodiment, the setting of the SLM is affected in such a way that the laser radiation is split into a matrix of points of light 11, which are caused to rotate about its center. FIG. 3 shows an example of an instantaneous image on a display 10 at the target seeker, illustrating how the target seeker would perceive the ship 1 and the formations 11 in the laser radiation emitted thence. In yet another embodiment (not shown), the SLM setting is affected in such a way that the matrices of points of light are counter-rotated. In an alternative embodiment the SLM setting is affected in such a way that the formations 11 move in accordance to a randomly generated scheme. The implementation of instructions in the computer software to enable the computer to perform these calculations so as to control the SLM setting is considered to constitute activity to be undertaken by one skilled in the art depending on the type of equipment used, and thus does not need to be described in detail here.

The matrix patterns described above are intended to "saturate" the target seeker, which occurs in that the calculation functions that extract targets from the image and calculate target paths from the extracted targets become saturated. If numerous targets are extracted from the same image and move in such a way that their target paths converge and diverge the entire time, the calculating capacity of the target seeker is soon exceeded, and it is forced to ignore certain detections and certain target paths.

It is also possible to affect the SLM setting in such a way that the intensity pattern of the laser radiation is such that one or more images of the actual platform, in this case the ship 1, are projected in the target seeker in moving formations. In one embodiment the SLM settings are controlled so that these "virtual" ships move obliquely downward in the target seeker image in order to induce the missile to steer down into the ocean, or laterally to induce the missile to steer away from the ship 1.

To create formations of virtual targets on the target seeker display 10 that are capable of confusion with the actual platform, i.e. the ship, it is preferable to use information regarding the range to the missile as well as information regarding the angular relationship of the missile to the ship. An example of a simple device that provides the range information consists of the laser 4, a conventional receiver or transmitter (not shown) that detects a pulse emitted by the laser and reflected from the missile, and a time-measuring device (not shown) that is connected to the laser and the receiver and intended to measure the time that elapses between the transmission of the pulse from the laser and the detection of the reflected pulse. The range is then obtained by multiplying one-half the measured time by the speed of light. In an alternative embodiment, the position data obtained via the search system 8, 9 are used as range information. The position data also provide information regarding the angular relationship of the target to the ship 1. Knowing the range to the missile and the angular relationship of the missile to the ship, it is possible to estimate how the actual ship is being perceived by the target seeker, and how emitted laser radiation will appear to the hostile target seeker, and to thereby optimize the SLM setting so that the emitted laser radiation achieves the maximum possible effect. In one simple example the computer is arranged to receive the range information and set the SLM so that the rotating matrix of points is projected in the target seeker of the missile when the range exceeds a predetermined range, and to set the SLM so that an image of the actual platform, the ship 1, is projected when the range is shorter than the predetermined range. It is also advantageous to adjust the SLM setting based on the type of object on which the target seeker is located. It is obvious that the best SLM setting when the hostile object is a missile is not necessarily the best setting when the hostile object is, for instance, a ship.

Figure 5:
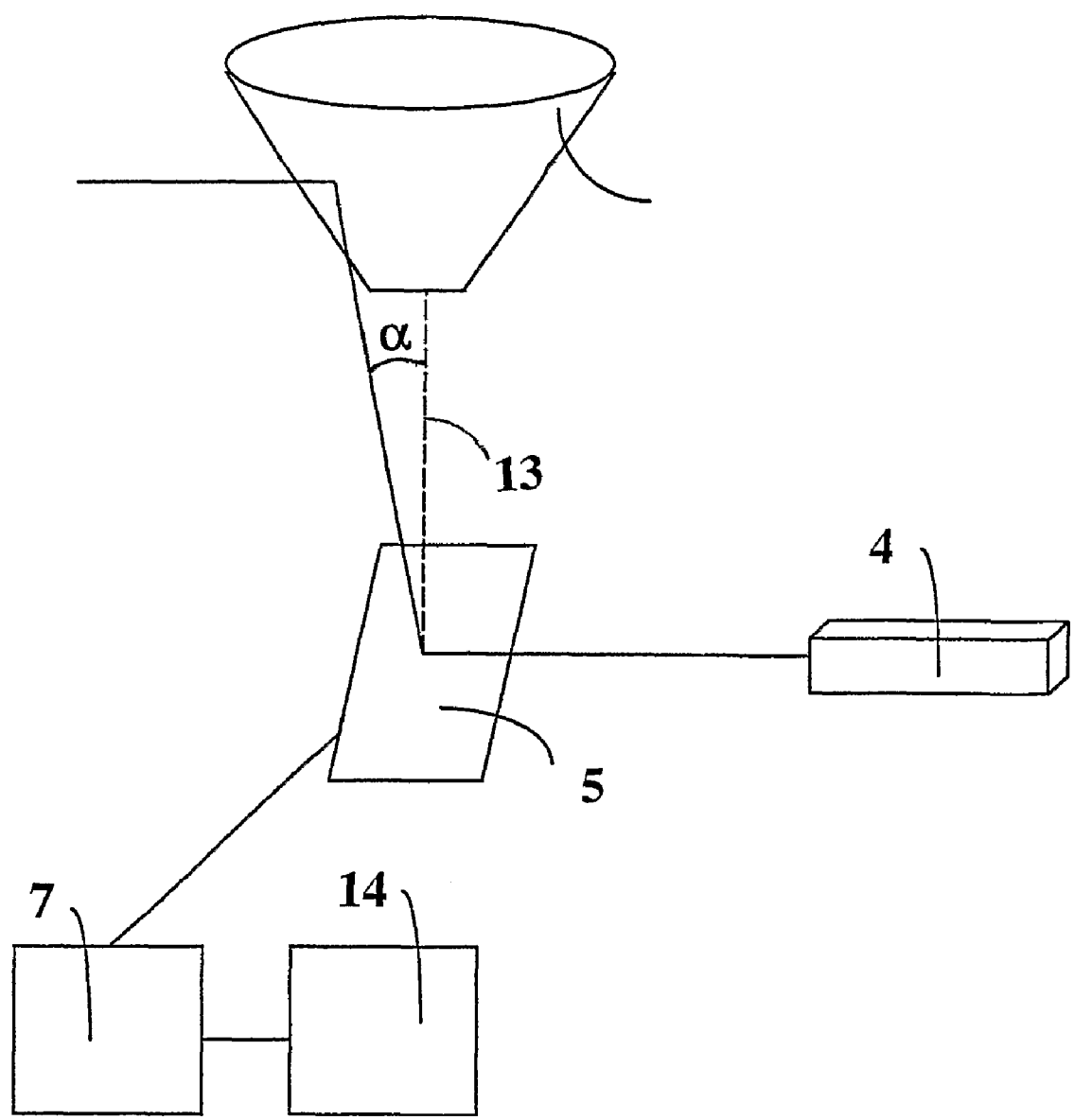
FIG. 5 schematically depicts a second embodiment of the jamming equipment according to the invention.

In an alternative embodiment, shown in FIG. 5, the laser 4 and the SLM 5 are not disposed on the rotating table 6 described above. Another important property of the SLM is utilized instead, namely that the wave front of a laser beam that strikes the SLM 2 can be guided off at a different angle than the one obtained upon reflection from the surface of the SLM 2. The angle of modulation is changed by controlling the SLM surface. The use of angles of modulation a of up to 4° is realistic at present.

In this embodiment, a mirror 12 is placed in the beam path from the SLM 5 so that it is possible, by guiding the laser radiation from the SLM 5, to guide the laser beam over same toward the target seeker. In this example the mirror 12 is conformed as an envelope surface of a circular truncated cone. The laser 4, the SLM 5 and the mirror 12 are fixedly suspended at a mutual distance from one another in such a way that they are immobile in relation to one another. The beam from the laser 1 thus always strikes the SLM 2 from the same angle.

As indicated above, the conic mirror 12 is positioned with its truncated top in the middle of the beam path 13 of any undesired reflections from the surface of the SLM 5. In one example, a light trap in the form of a laser-light-absorbent material is present at the top of the truncated cone to absorb the undesired reflections. With the reflecting envelope surface of the mirror disposed symmetrically around the imagined undesired reflected beam path 13, it is possible to guide the beam from the SLM so that, after being reflected from the envelope surface of the mirror, it is directed toward the target seeker, assuming that the target seeker is moving within an area of 360° around and approximately ±45° in the vertical direction in relation to the axis of symmetry of the mirror.

The computer 7 is equipped with software for inputting information from a user in order to aim the laser beam toward the target tracker, expressed in terms of, e.g. its coordinates or with the help of aiming angles. The software includes instructions for calculating how the beam from the SLM 5 is to be guided in order to obtain a beam reflected from the mirror 12 that is aimed as input by the user, plus instructions for setting the pattern of the SLM 5 in accordance therewith. It will be obvious to one skilled in the art how these calculations would be carried out, and how they could be implemented in software. It should be noted that a given pattern for an SLM guides only laser light within a certain wavelength effectively. Different laser wavelengths consequently require the calculation of different SLM patterns.

In the example shown in FIG. 5 the laser 4, the SLM 5 and the mirror 12 are fixedly suspended in a system together with a gyro 14. The computer 7 is connected to the gyro 14 and arranged to receive, via an interface (not shown) from the gyro, data regarding movements in the system. When calculating the SLM setting, movements in the system are compensated for so that the beam from the system is aimed at a specified point in space, regardless of the movements of the system. It will be obvious to one skilled in the art how this could be implemented in the software. The system can thus be stabilized without the need for moving parts such as a rotating table or stabilizing table. This yields very major cost benefits in connection with design, manufacture and maintenance.

The invention claimed is:

1. A jamming device on an object for jamming a target seeker arranged to generate an image of its surroundings and extract targets from the image, the device comprising:
   a laser arranged to emit laser radiation toward the target seeker so that the laser radiation is projected on the image,
   a modulator disposed in connection to the laser and arranged to modulate a phase and amplitude of a cross-section of the laser radiation to manipulate the image to make the image more difficult for the target seeker to extract the object as a target, wherein the modulator comprises a spatial light modulator, and
   a control configured to control a setting of the spatial light modulator to alter the image so that the image displays a plurality of virtual targets that move in accordance with a predetermined scheme.

2. The device according to claim 1, further comprising:
   elements arranged to determine a range to the target seeker, wherein the control is arranged to take said range into account when controlling the spatial light modulator setting.

3. The device according to claim 1, wherein the predetermined scheme entails that the virtual target paths converge and diverge in alternating fashion.

4. The device according to claim 1, wherein the control is arranged to control the spatial light modulator setting so that the virtual targets in the image are capable of confusion with the object.

5. A method for jamming a target seeker that generates an image of its surroundings and extracts targets from the image, the method comprising:
   emitting laser radiation toward the target seeker so that the laser radiation is projected on the image; and
   modulating a phase and an amplitude of the laser radiation to manipulate the image, whereby a control controls a spatial light modulator setting to alter the image so that the image displays a plurality of virtual targets that move in accordance with a predetermined scheme, whereby a difficulty for the target seeker to extract an object as a target increases.

* * * * *